United States Patent
Wood (10) Patent No.: US 8,342,918 B2
(45) Date of Patent: Jan. 1, 2013

(54) BIRD DEBREASTING TOOL AND METHODS

(76) Inventor: Oneal Wood, Golden, MS (US)

(*) Notice: Subject to any disclaimer, the term of this patent is extended or adjusted under 35 U.S.C. 154(b) by 0 days.

(21) Appl. No.: 13/217,960

(22) Filed: Aug. 25, 2011

(65) Prior Publication Data

US 2012/0052782 A1    Mar. 1, 2012

Related U.S. Application Data (60) Provisional application No. 61/377,905, filed on Aug. 27, 2010.

(51) Int. Cl.
*A22C 17/00* (2006.01)
(52) U.S. Cl. .................................................... 452/137
(58) Field of Classification Search .................. 452/103, 452/185, 102, 105, 187
See application file for complete search history.

(56) References Cited

U.S. PATENT DOCUMENTS

| | | | |
|---|---|---|---|
| 606,123 A | 6/1898 | Coates | |
| 1,374,819 A | 4/1921 | Byer | |
| 2,298,580 A * | 10/1942 | Miron | 452/185 |
| 2,587,007 A * | 2/1952 | Southward et al. | 452/185 |
| 2,603,829 A * | 7/1952 | Siskoff | 452/185 |
| 2,737,718 A | 3/1956 | Maunu | |
| 2,785,436 A * | 3/1957 | Noland et al. | 452/185 |
| 2,834,981 A * | 5/1958 | Willis | 452/185 |
| 2,863,165 A * | 12/1958 | Hartman | 452/185 |
| 2,891,275 A * | 6/1959 | Schuls | 452/185 |
| D251,232 S | 3/1979 | Yamamoto | |
| 5,463,814 A | 11/1995 | Stowell et al. | |
| 6,602,124 B2 * | 8/2003 | Miller | 452/185 |
| 7,032,316 B1 | 4/2006 | Tseng | |

FOREIGN PATENT DOCUMENTS

| | | |
|---|---|---|
| CN | 201709300 | 1/2011 |
| JP | 2000185182 | 7/2000 |
| JP | 2002058884 | 2/2002 |

* cited by examiner

*Primary Examiner* — Richard Price, Jr.
(74) *Attorney, Agent, or Firm* — Waddey & Patterson, PC; Matthew C. Cox (57) ABSTRACT

An apparatus for removing a breast from a game bird provides first and second blades pivotally attached to a stabilizer bar projecting outwardly between the first and second blades. The stabilizer bar is generally adapted for insertion into the abdomen of a bird, and the first and second blades can be actuated using one or more handles to create a scissoring effect whereby a region of the abdomen, or the breast, is severed from the bird. Methods of removing a breast from a bird are also disclosed.

19 Claims, 11 Drawing Sheets

BIRD DEBREASTING TOOL AND METHODS

CROSS-REFERENCES TO RELATED APPLICATIONS

This application claims benefit of the following patent application(s) which is/are hereby incorporated by reference: Ser. No. 61/377,905, filed Aug. 27, 2010 titled "IMPROVED FOWL DEBREASTING TOOL AND METHODS THEREFOR".

BACKGROUND

1. Technical Field

The present disclosure relates generally to cutting tools and more particularly to handheld machinery and methods for debreasting a game bird.

2. Background Art

Conventional knives and bladed instruments for cutting and shearing meat from game animals are known in the art. Such instruments include single bladed knives having one or more sharpened edges for cutting game meat. Some conventional edged instruments known in the art for removing meat from game animals include blades having unique geometric shapes designed for optimal meat removal. Other devices known in the art include conventional hunting and kitchen knives.

In many applications, it is generally desirable to remove only the breast from a game bird. For example, when a species of game bird such as dove, duck, quail, pheasant, grouse, woodcock, partridge, etc. is harvested, a significant portion of the desirable meat for human consumption is found in the breast region on the underside of the bird abdomen. Sportsmen and sportswomen often prefer to remove and keep only the intact breast region of a bird and discard the remainder of the carcass. The breast region typically is removed using a knife or other type of cutting instrument. In many applications, however, a conventional knife or other cutting instrument does not provide an optimal breast removal tool for cleaning wild fowl. For example, a knife may slip in the user's hand or may inadvertently pierce entirely through the bird abdomen and cause injury the user. Moreover, the cleaning process using a handheld knife is slow. In many situations, a single hunter or group of hunters may harvest several dozen birds, which can require multiple hours to clean using conventional tools and methods. Additionally, conventional tools and methods do not efficiently remove the maximum amount of consumable breast meat, and thus result in waste.

Others have attempted to improve upon conventional handheld tools and methods for cleaning game bird by providing game shears, or scissors, for removing meat. Such conventional game shears typically include opposing blades connected at a pivoting joint. However, such conventional game shears are difficult to use in many applications because the bird abdomen may inadvertently move, or slip, between the blades during use. Additionally, conventional game shears do not rigidly hold the abdomen in place as the opposing blades approach from the sides, allowing slippage of the bird and causing damage to the breast meat and potential injury to the user, and further resulting in inefficient meat removal.

What is needed are improvements in the devices and methods for removing meat from a game animal, and particularly for debreasting a game bird.

BRIEF SUMMARY

One object of the present disclosure is to provide a tool for removing meat from an animal.

Another object of some embodiments of the present disclosure is to provide a tool for debreasting, or removing the breast meat from the abdomen of, a game bird.

Yet another object of some embodiments of the present disclosure is to provide a tool for quickly removing the breast meat and attached keel bone of a game bird.

A further object of some embodiments of the present disclosure is to provide a tool for quickly separating and removing the breast meat of a game bird from the keel bone, thereby providing a boneless fillet of game bird breast meat.

Yet another object of some embodiments of the present disclosure is to provide a tool that can interchangeably be used to either remove the breast meat and attached keel bone from the abdomen of a game bird, or separate and remove the breast meat from the keel bone of a game bird, thereby providing a boneless filet of game bird breast meat.

A further object of the present disclosure is to provide a tool that can hold a game bird relatively stationary while simultaneously cutting the breast from the body of the game bird using at least two cutting blades for quickly removing the breast meat.

Yet another object of the present disclosure is to provide a method of removing meat from a game bird using a tool having a stabilizer bar and at least two blades pivotally attached to the stabilizer bar.

A further object of the present disclosure is to provide a method for quickly removing the breast of a dove.

Yet another object of the present disclosure is to provide a method of using a tool having at least three blades to quickly remove the breast meat of a dove.

Numerous other objects, features and advantages of the present disclosure will be readily apparent to those of skill in the art upon a reading of the following disclosure when taken in conjunction with the accompanying drawings.

DETAILED DESCRIPTION

Figure 1:
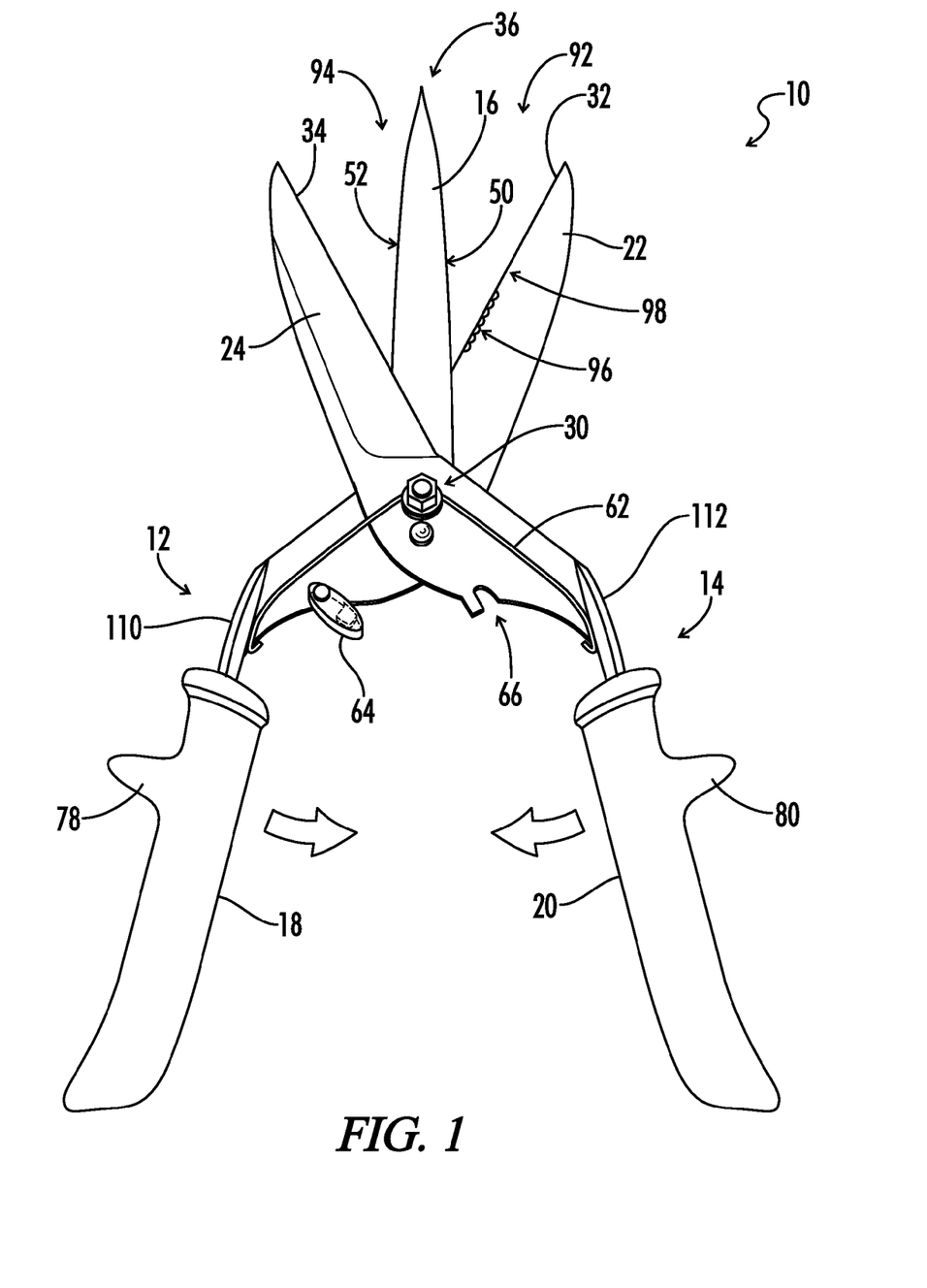
FIG. 1 illustrates a plan view of one embodiment of a game meat removal tool in an open position in accordance with the present disclosure.

Referring now to the drawings, one embodiment of the present disclosure provides a meat removal tool, illustrated generally in FIG. 1 and designated by the numeral 10. It is understood that in the drawings, not all reference numbers are included in each drawing, for the sake of clarity. In addition, positional terms such as a "upper," "lower," "side," "top," "bottom," "vertical," "horizontal," etc. refer to the apparatus when in the orientation shown in the drawing. The skilled artisan will recognize that objects in accordance with the present disclosure can assume different orientations when in use.

Referring to FIG. 1, one embodiment of an apparatus for removing breast meat from a bird, or a meat removal tool 10 in accordance with the present disclosure is illustrated generally in an open position. Meat removal tool 10 defines a first opening 92 and a second opening 94. As seen in an exploded view in FIG. 3, the tool 10 generally includes a first member 12, a second member 14 and a third, or center, member 16. The first and second members 12, 14 are generally pivotally attached at a pivoting joint 30, seen in FIG. 1.

First member 12 includes a first handle 18, and second member 14 includes a second handle 20. The first handle 18 can be integrally formed on first member 12, and the second handle 20 can be integrally formed on second member 14 in some embodiments. In other embodiments, first handle 18 includes a separate part that is installed onto first member 12, and second handle 20 includes a separate part that is installed onto second member 14. The first and second handles 18, 20 in some embodiments comprise a plastic material such as but not limited to nylon, polypropylene, polyethylene, acrylonitrile butadiene styrene (ABS), polystyrene, polyamides, rubber, etc. First and second handles 18, 20 include a textured surface in some embodiments to improve grip in cold or wet conditions. In some embodiments, the first and second handles 18, 20 include a camouflage pattern or other colored pattern to improve or to reduce visibility.

Figure 14:
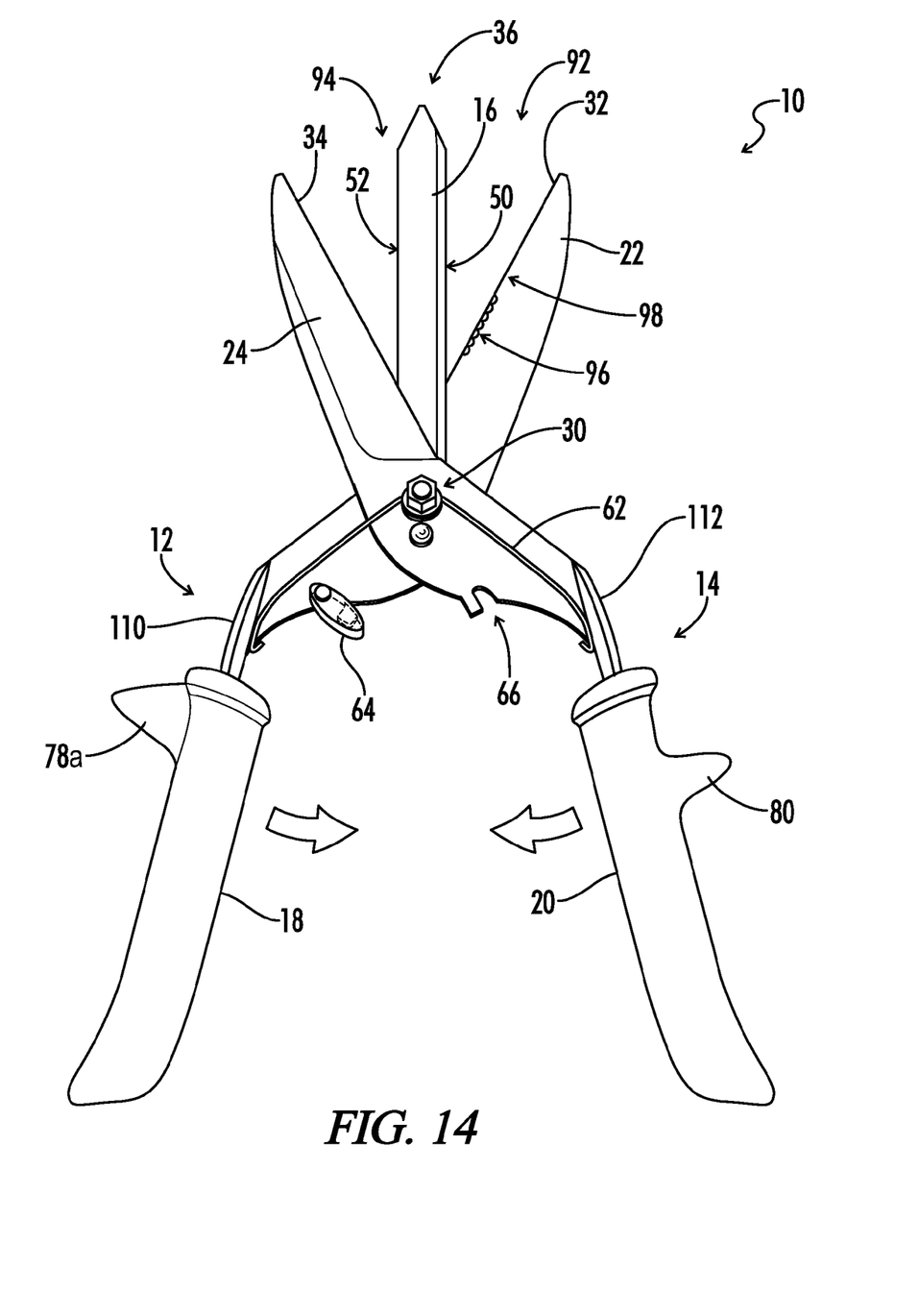
FIG. 14 illustrates an embodiment of a tool for removing a breast from a game bird, the tool having asymmetric handles.

As seen in FIG. 1, the first handle 18 in some embodiments includes a first handle flange 78 protruding outward from the first handle, and the second handle 20 includes a second handle flange 80 protruding outward from the second handle. The first and second handle flanges 78, 80 provide an extended surface against which a user may apply an axial, or longitudinal, force for driving one or more of the members into a game animal when the tool 10 is in the open position. In one embodiment, the first and second handle flanges 78, 80 protrude outward at an approximately ninety degree angle to each respective handle 12, 14. In some embodiments, the first and second handles 18, 20 are detachable from the respective first and second members 12, 14 on which they are installed and can be removed for cleaning. In some embodiments, the first and second handles are dishwasher-safe for cleaning in a dishwasher to remove blood following use. As seen in FIG. 1, first and second handles 18, 20 may include identical pieces. In other embodiments, as seen in FIG. 14, the first handle flange 78a may be located closer to stabilizer bar 16 than second handle flange 80. As such, first handle flange 78 is configured to engage a user's thumb or a region of a user's hand between the index finger and thumb, while the second handle flange is configured to engage the index finger or a portion of a user's hand between the index finger and the middle finger. As such, a user may be able to more easily exert required force on the handles to cut through the bones connecting the breast of a game bird to the bird's body. Also seen in FIG. 14, in some embodiments, first bar edge 50 is sharpened and is beveled toward first blade 22. Similarly, second bar edge 52 may be sharpened and beveled toward second blade 24. Additionally, in some embodiments, stabilizer bar 16 includes a distal end 36 that forms an angle with first and second bar edges.

Each first and second member 12, 14 also include a corresponding blade. First member 12 includes a first blade 22. First blade 22 includes a first blade edge 32, as illustrated generally in FIG. 1. First blade edge 32 can be sharpened for improved cutting performance. Similarly, second member 14 includes a second blade 24. Second blade 24 includes a second blade edge 34. Second blade edge 34 can be sharpened for cutting meat. Each of first and second blade edges 32, 34 can include a smooth or serrated sharpened edge. In some embodiments, one or both edges 32, 34 can include both a smooth sharpened region 98 and a serrated sharpened region 96, as illustrated in FIG. 1. Each serrated region can improve cutting performance through muscle ligaments or through cartilage or bone that connects the breast to the bird.

Also seen in FIG. 1, a stabilizer bar 16, or center member, protrudes from the pivoting joint 30 between first and second blades 22, 24. Stabilizer bar 16 includes a base and a distal end, or stabilizer bar point 36, extending from the base. The stabilizer bar is shaped for insertion into an abdomen of a game bird. Stabilizer bar 16 generally includes a first bar edge 50 facing first blade 22 and a second bar edge 52 facing second blade 24. During use, first and second blades 22, 24 generally move toward stabilizer bar 16 when first and second handles 18, 20 are moved toward each other, causing first and second members 12, 14 to pivot about pivoting joint 30. In some embodiments, first and second bar edges 50, 52 are fully or partially sharpened for providing a cutting interaction with corresponding first and second blade edges 32, 34. In some embodiments, first and/or second bar edges 50, 52 can be unsharpened and can provide an edge against which each respective first and second blade 22, 24 is passed for cutting meat from the game bird. In further embodiments, first and/or second bar edges 50, 52 can be fully or partially serrated for improving cutting performance or for stabilizing the bird to be cut on stabilizer bar 16. Thus, in some embodiments, the stabilizer bar 16 serves as a blade, including sharpened bar edges 50, 52. In additional configurations, stabilizer bar 16 provides a support for securing a fowl body to be debreasted between first and second blades 22, 24.

Figure 2:
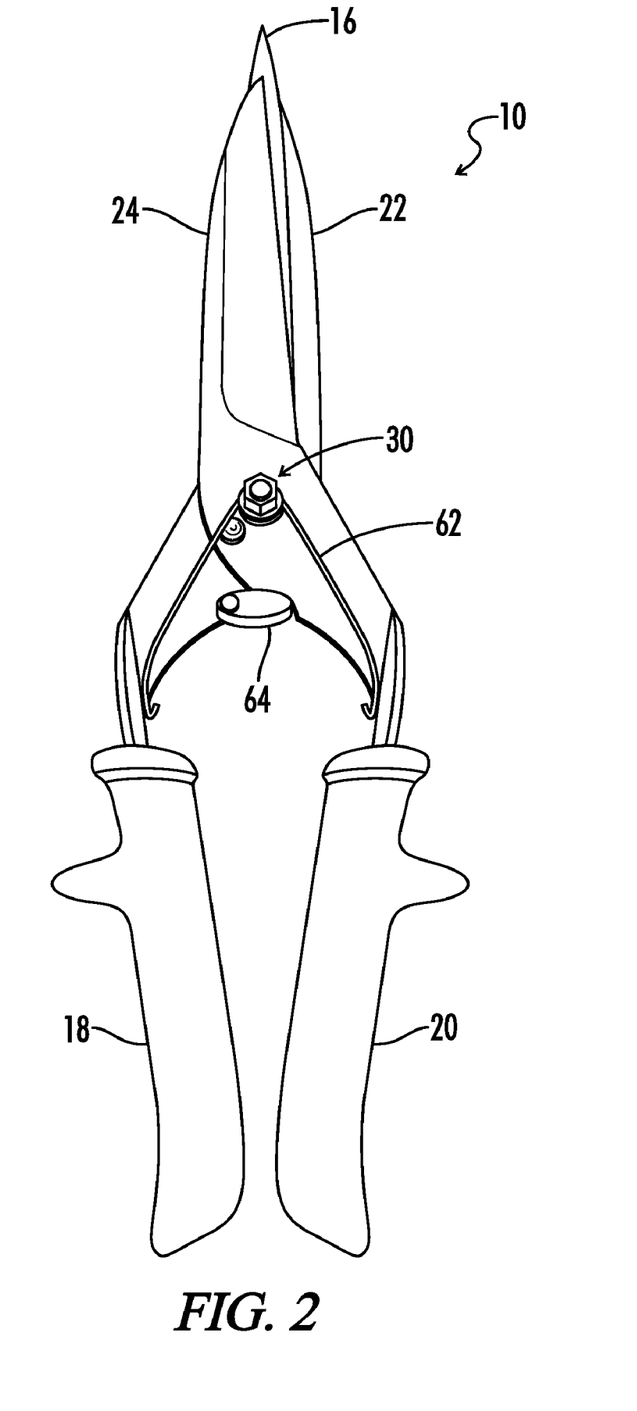
FIG. 2 illustrates a plan view of one embodiment of a game meat removal tool in a closed position in accordance with the present disclosure.

Also seen in FIG. 1, a latch 64 can be disposed on first member 12. A notch 66 is defined in second member 14. Latch 64 can generally rotate toward notch 66 when tool 10 is in the closed position, as seen in FIG. 2. Latch 64 generally engages notch 66 to releasably secure the tool 10 in the closed position. It is understood that in accordance with the present disclosure, in other embodiments, latch 64 can be positioned on second member 14 and notch 66 can be positioned on first member 12.

Referring further to FIG. 1, in some embodiments, a spring 62 is positioned between first and second blades. Spring 62 can include a torsion spring in some embodiments and may be positioned on tool 10 for biasing the tool 10 in the open position. Spring 62 can in some embodiments include a coil that is aligned with pivoting joint 30. As seen in FIG. 1, in some embodiments, first member 12 includes a first blade 22 and a first member flange 110 attached to first blade 22. First member flange 110 generally includes a structure oriented at an angle to the plane of first blade 22. In some embodiments, spring 62 includes a first spring arm that engages first member flange. As such, first spring 62 exerts an outward force on first member flange 110 for biasing first member in an open position, as seen in FIG. 1. Similarly, second member 14 includes a second blade 24 and a second member flange 112 attached to second blade 24. Second member flange 112 generally includes a structure oriented at an angle to the plane of second blade 24. In some embodiments, spring 62 includes a second spring arm that engages second member flange 112 for biasing second member in an open position, as seen in FIG. 1. In other embodiments, first spring arm may engage another structure on first member 12, and/or second spring arm may engage another structure on second member 14, for biasing first and second members in an open position.

Figure 3:
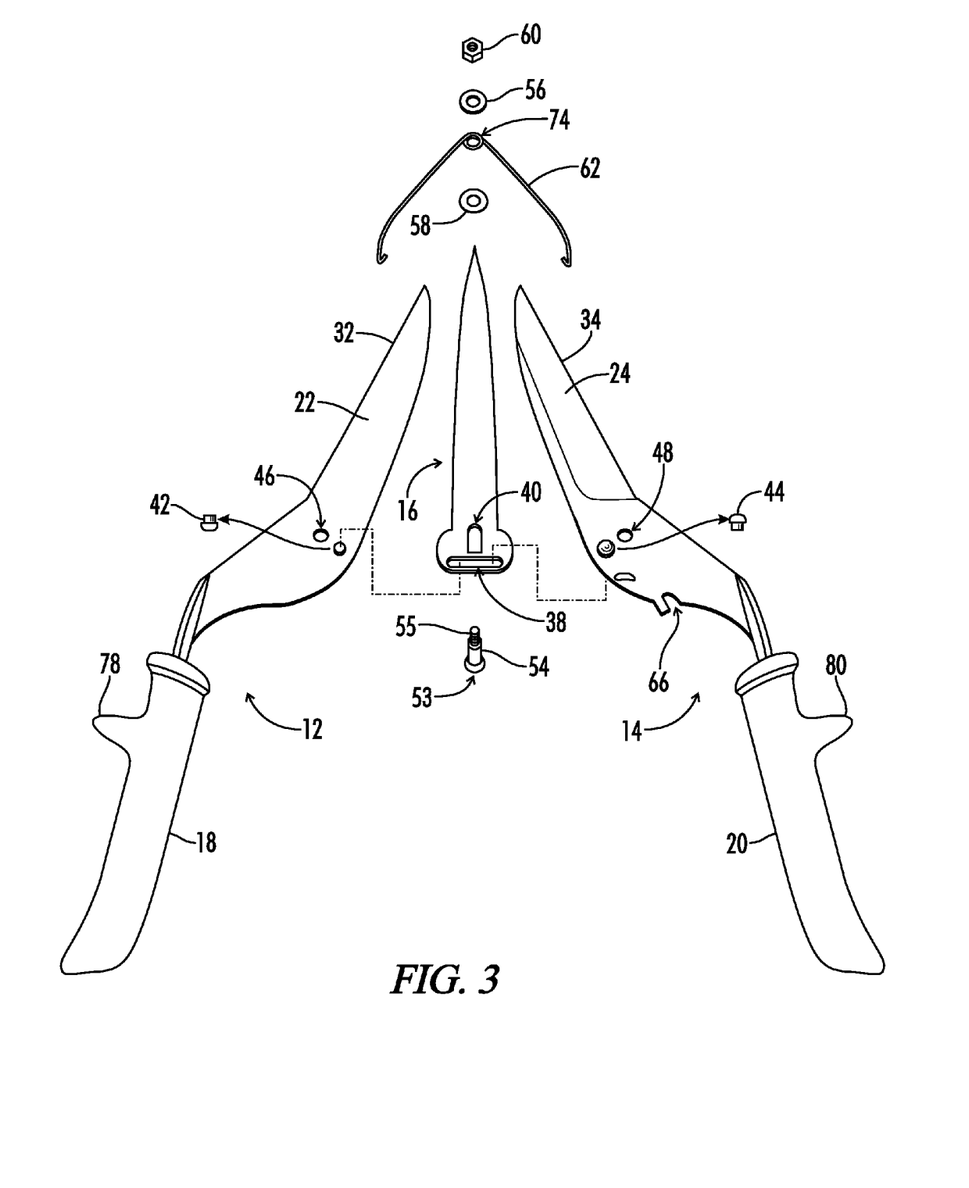
FIG. 3 illustrates an exploded view of one embodiment of a game meat removal tool having a stabilizer bar in accordance with the present disclosure.

Referring further to FIG. 3, stabilizer bar 16 in some embodiments defines a bar fastener slot 40. Additionally, first blade 22 includes a first clearance hole 46, and second blade 24 includes a second clearance hole 48. First and second member clearance holes 46, 48 and bar fastener slot 40 can be axially aligned when tool 10 is fully assembled. In some embodiments a fastener 53 can be inserted through each of first and second clearance holes 46, 48 and through bar fastener slot 40 to pivotally join first and second members 12, 14 to stabilizer bar 16. In some embodiments, bar fastener slot 40 defines a larger void area than the cross sectional profile of fastener 53, allowing fastener 53 to translate in one or two dimensions, or in the plane of stabilizer bar 16, when positioned in bar fastener slot 40. In some embodiments, as seen in FIG. 3, fastener 53 includes a threaded region 55 and a smooth region 54. The threaded region 55 generally engages a threaded fastener nut 60. In some embodiments, spring 62 includes a spring aperture 74 aligned with and disposed about fastener 53. Spring aperture 74 generally includes an inner diameter greater than the outer diameter of fastener 53. In some embodiments, first and second washers 56, 58 are disposed on fastener 53 on either side of spring aperture 74. In some embodiments, first washer 56 is positioned between fastener nut 60 and spring 62, and second washer 58 is positioned between spring 62 and second blade 24.

Also seen in FIG. 3, first member 12 generally includes in some embodiments a first travel pin 42 protruding from first blade 22 generally toward stabilizer bar 16. First travel pin 42 slidably engages a bar travel slot 38 defined in the base of stabilizer bar 16. Bar travel slot 38 is oriented substantially transverse to the longitudinal axis of stabilizer bar 16 in some embodiments. Thus, when first blade 12 pivots about fastener 53, first travel pin 42 slidably translates through bar travel slot 38. Similarly, in some embodiments, second blade 24 includes a second travel pin 44 protruding from second blade 24 toward stabilizer bar 16. Second travel pin 44 slidably engages bar travel slot 38 when second blade 14 is pivoted about fastener 53 relative to stabilizer bar 16. First and second travel pins 42, 44 in some embodiments effectively allow pivoting of first and second blades 22, 24 relative to stabilizer bar 16 while keeping stabilizer bar 16 angularly equidistant from first and second blade edges 32, 34.

In some applications, tool 10 can be used to quickly remove the breast from a bird. More particularly, tool 10 is adapted to quickly and efficiently cut meat from the abdomen of wild game birds, for example but not limited to ducks, dove, quail, pheasant, grouse, geese, etc. In some additional embodiments, it is understood that tool 10 of the present disclosure is adaptable for removing meat from the abdomen of domesticated or pen-raised birds such as chickens. Further, the present disclosure could alternately be used for cutting objects in other applications where it is desirable to keep the object to be cut stationary relative to blades approaching from the side.

Figure 9:
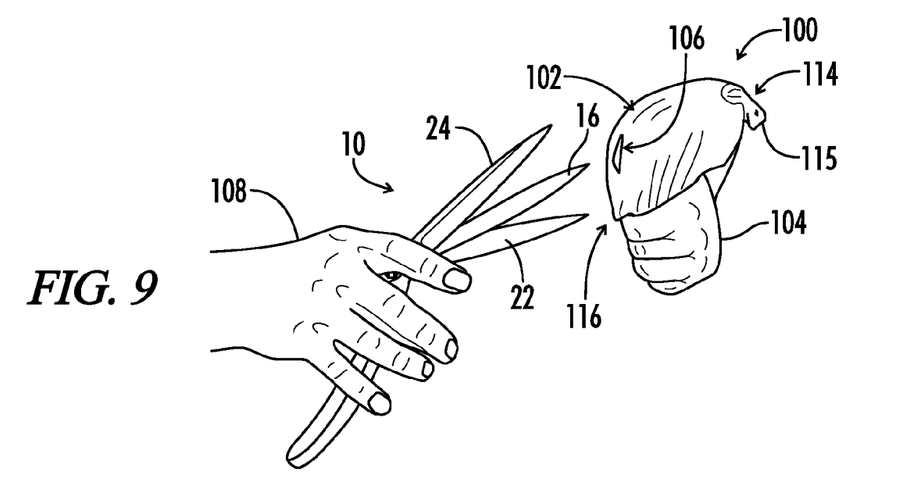
FIG. 9 illustrates an exemplary embodiment of one step of a method of using a game meat removal tool to remove meat from a game animal in accordance with the present disclosure.
Figure 10:
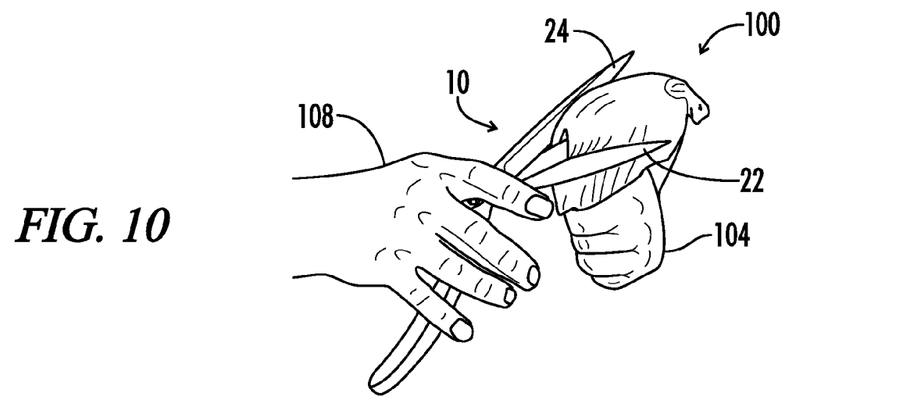
FIG. 10 illustrates an exemplary embodiment of one step of a method of using a game meat removal tool to remove meat from a game animal in accordance with the present disclosure.
Figure 11:
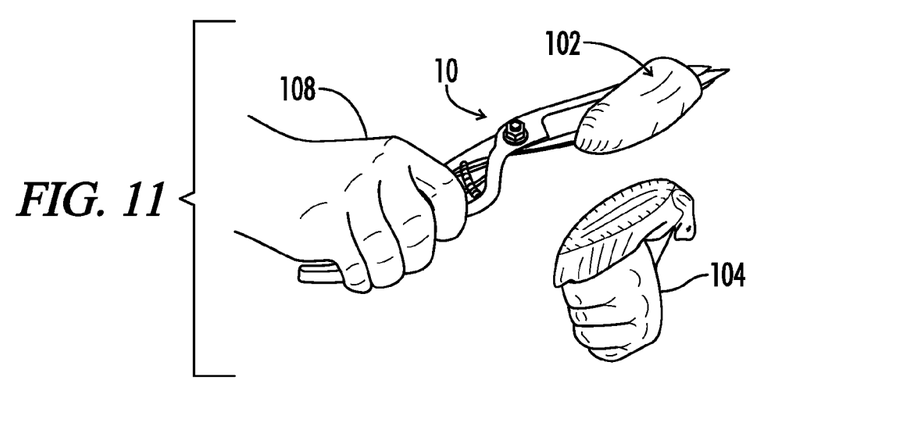
FIG. 11 illustrates an exemplary embodiment of one step of a method of using a game meat removal tool to remove meat from a game animal in accordance with the present disclosure.
Figure 12A:
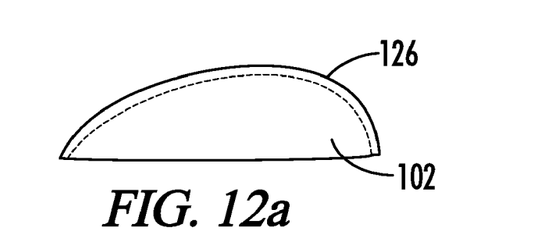
FIGS. 12A-12E illustrate collectively an exemplary embodiment of multiple steps of peeling skin from a game bird's breast that has been removed using a tool in accordance with the present disclosure.
Figure 12B:
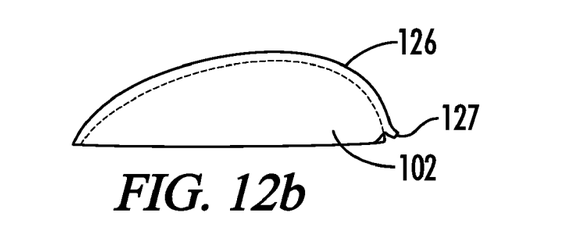
Figure 12C:
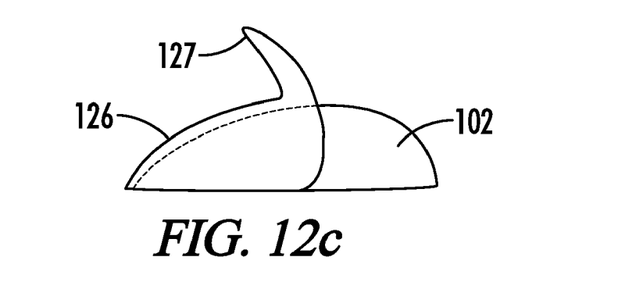
Figure 12D:
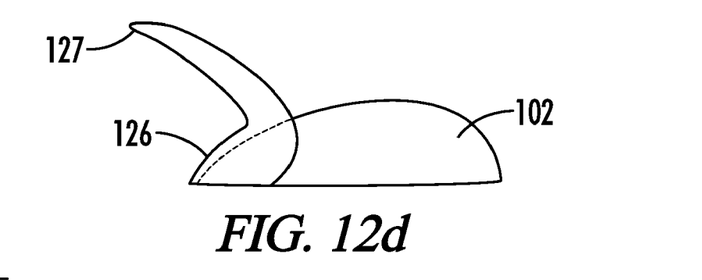
Figure 12E:
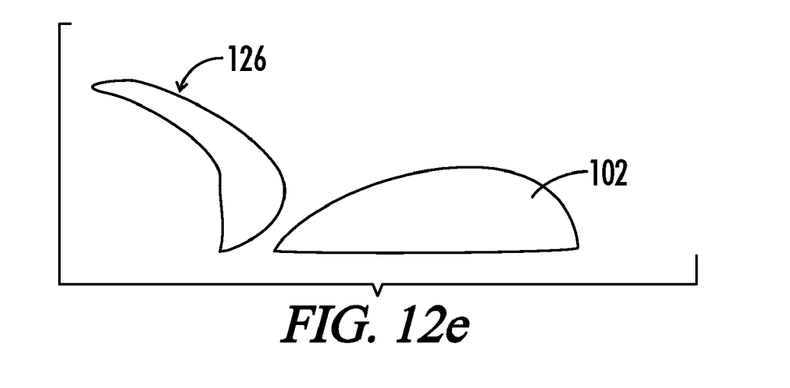

Referring now to FIGS. 9-11, in some embodiments, the present disclosure provides a method of removing meat from an animal using tool 10. The method includes providing a tool 10 in accordance with an embodiment of the above disclosure. Another step includes providing a meat sample 100 to be cut. In some embodiments, meat sample 100 includes a game bird. In one particular embodiment, the meat sample is a dove, quail, duck or pheasant. The breast region 102 generally includes a posterior region 116 and an anterior region 114. The anterior region 114 is located closer to the bird's head 115. In some embodiments, the meat sample 100 includes an entire bird. The bird can generally be held in a first hand 104 so that the breast region 102 on the bird abdomen is generally facing upward toward the user and the head 115 is extending away from the user.

The user may then insert stabilizer bar 16 into the bird's abdomen, starting at the posterior end 116, as illustrated generally in FIG. 10, and extending toward the anterior end 114. The stabilizer bar 16 in some embodiments can puncture directly into the abdomen tissue between the breast and the spine. In other embodiments, an incision 106 can be first formed in the breast region 102, and the stabilizer bar 16 can be inserted through the incision. Generally, when the stabilizer bar is inserted into the breast region 102, the first and second blades 22, 24 extend outwardly along opposite sides of the breast region as seen generally in FIG. 10. From this position, the user may squeeze the first and second handles as seen in FIG. 11, causing the first and second blades 22, 24 to move toward the stabilizer bar 16. The movement of the first and second blades 22, 24 relative to the stabilizer bar 16 causes a cutting effect on each side of the ribcage that severs the intact breast 102 from the bird.

After the breast is removed from the bird, the skin must be peeled from the breast before cooking. As seen in FIGS. 12A-12E, skin 126 may be pulled from the severed breast 102. A skin tab 127 can be formed on one end of the severed breast region 120, and the tab 127 can be peeled back from the breast region 102, resulting in a skinless severed breast region 102, seen in FIG. 12E.

Figure 13:
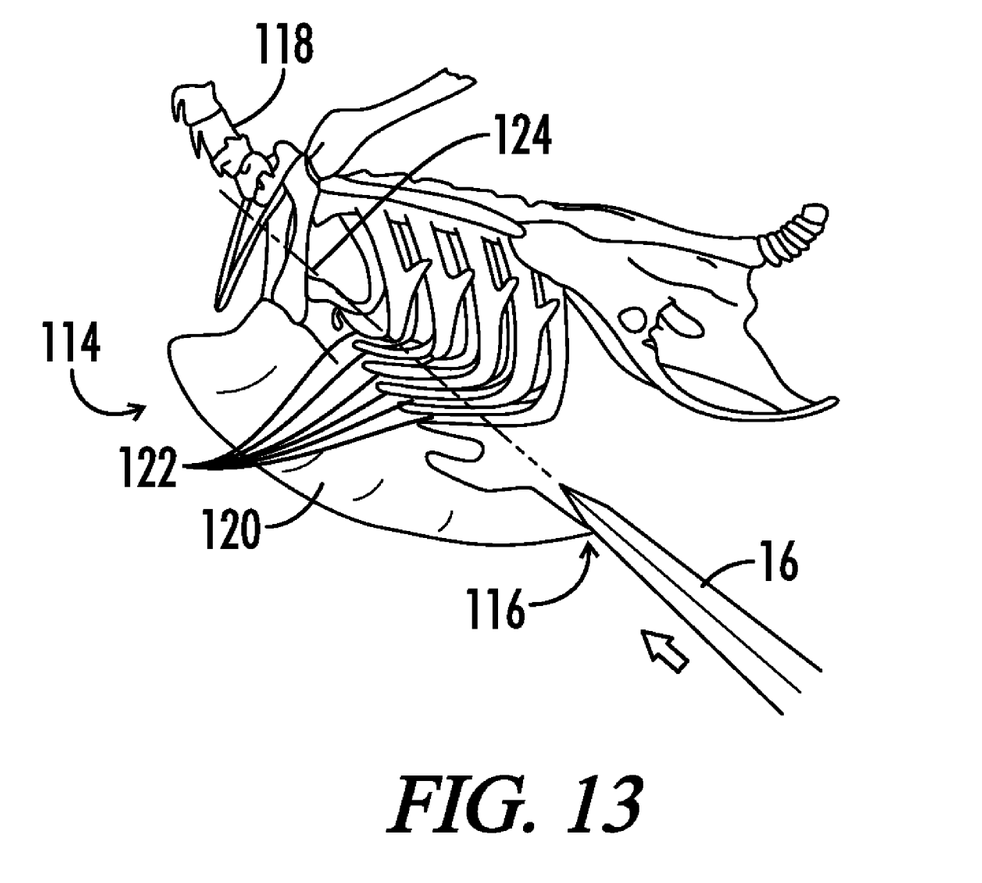
FIG. 13 illustrates an embodiment of one mode of operation for using a tool for removing meat from a bird in accordance with the present disclosure

Referring to FIG. 13, many game birds include a T-shaped bone referred to as a breastbone, or keel bone 120, protruding downward from the abdomen and bisecting the breast region 102 into halves. The desirable breast meat is usually attached to either side of the keel bone 120 in some game birds. The keel bone 120 generally includes meat on both lateral sides of the keel bone 120. In some embodiments, the present disclosure provides at least two modes for removing meat from the bird. In a first mode, the stabilizer bar 16 is inserted into the bird on the interior side of the keel bone 120, as illustrated in FIG. 13, such that the tip of the stabilizer bar 16 protrudes from the anterior end of the bird's abdomen. From this position, the first and second blades approach the abdomen laterally from the sides, as seen in FIG. 10, when the handles are squeezed. When the first and second blades engage the bird, bones including ribs 122, coracoids 124 and any additional tissue between the breast 102 and the bird abdomen are severed, thereby allowing the keel bone 120 and intact breast 102 to be removed cleanly from the bird abdomen.

Figure 4:
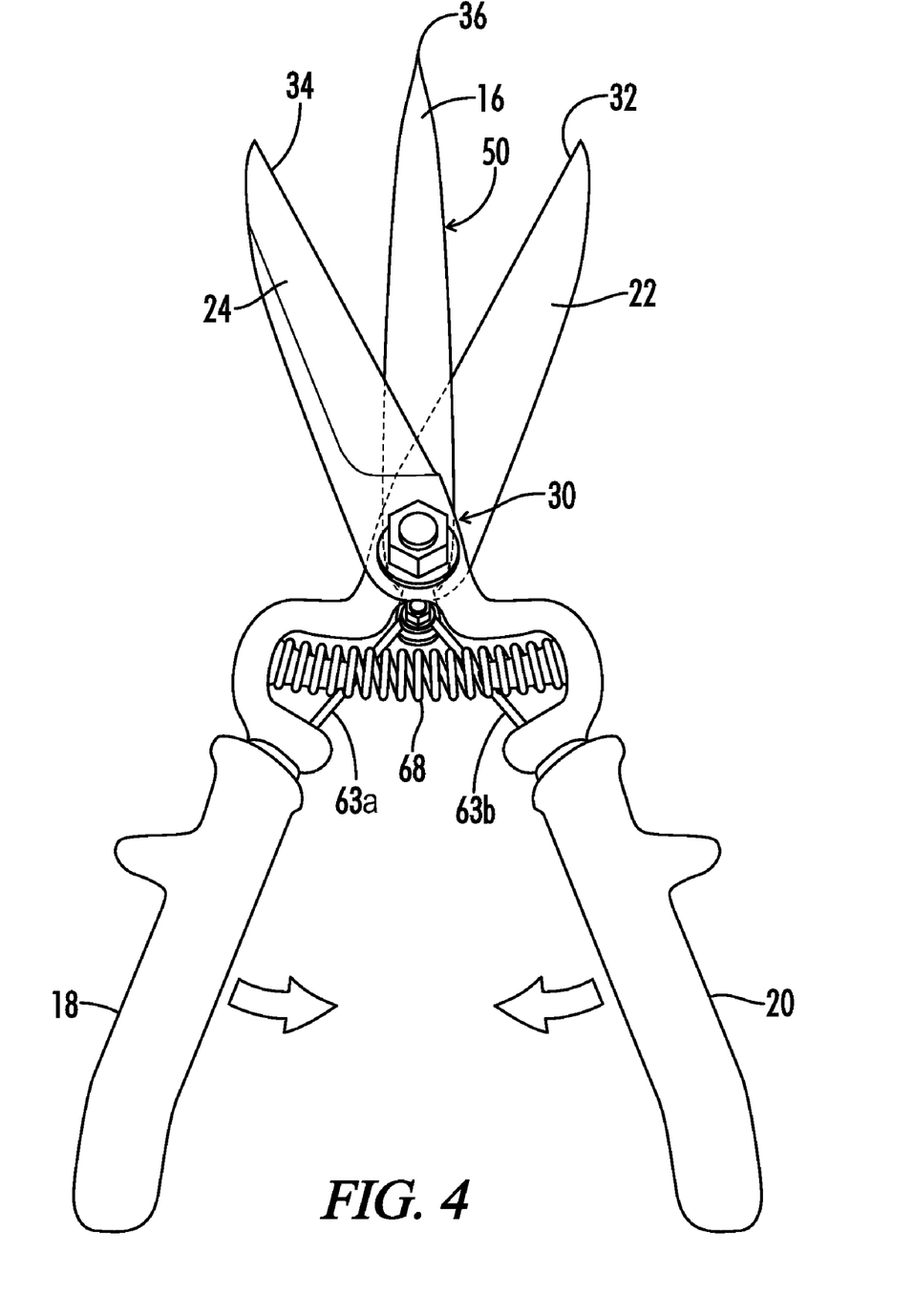
FIG. 4 illustrates a plan view of one embodiment of a game meat removal tool in an open position in accordance with the present disclosure.
Figure 5:
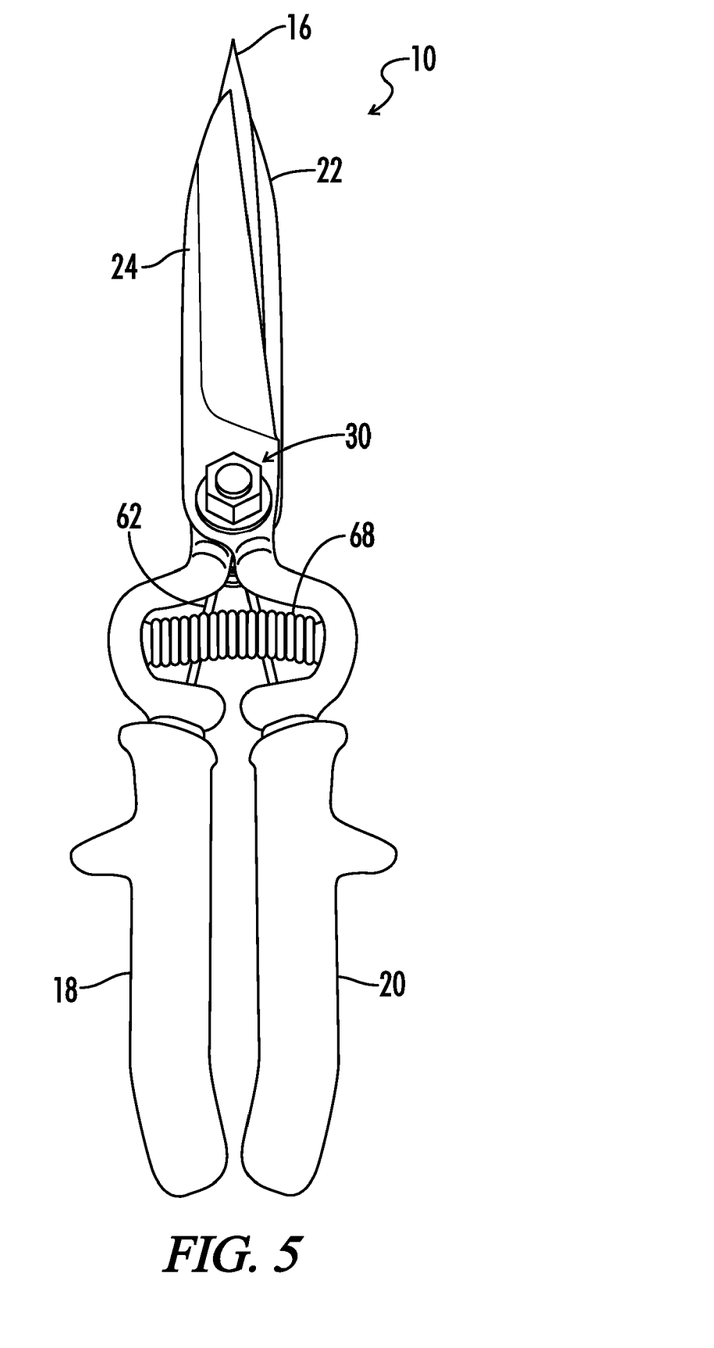
FIG. 5 illustrates a plan view of one embodiment of a game meat removal tool in a closed position in accordance with the present disclosure.

In some applications, the first and second blades 22, 24 may not release completely from the closed position, seen in FIG. 2, after the breast region 102 is severed from the bird abdomen. This can be due to tissue becoming lodged between the first and second blades and the stabilizer bar. In some embodiments, the present disclosure provides a compression spring 68, seen in FIG. 4-FIG. 6, positioned between first and second members 12, 14. The compression spring 68 can be a coil compression spring defining a hollow center void. In some embodiments, the first member 12 includes a first spring post 70, seen in FIG. 6, protruding from the first member 12 toward the second member 14. The first spring post 70 in some embodiments is disposed in the hollow center void of the compression spring 68. Also seen in FIG. 6, a second spring post 72 protrudes from the second member 14 generally toward the first member 12. The second spring post 72 is generally disposed in the opposite end of the hollow center void of the compression spring 68. Thus, the compression spring 68 can be housed on tool 10 between first and second spring posts 70, 72. In some embodiments, the compression spring 68 is held in place by a compression fit between first and second members 12, 14. Also seen in FIG. 6, in some embodiments an aperture post 76 protrudes from stabilizer bar 16. The aperture post 76 generally extends through the spring aperture 74 defined on spring 62. In this embodiment, the torsion spring aperture 74 is not disposed on the fastener 53. Rather the fastener 53 extends through the bar fastener slot 40 defined in stabilizer bar 16 and engages a threaded nut 60. Aperture post 76 protrudes from stabilizer bar 16 in some embodiments and includes an aperture post threaded end engaging a post nut 84. In some embodiments, a post washer 82 is disposed on the aperture post 76 between the post nut 84 and the spring 62.

Figure 6:
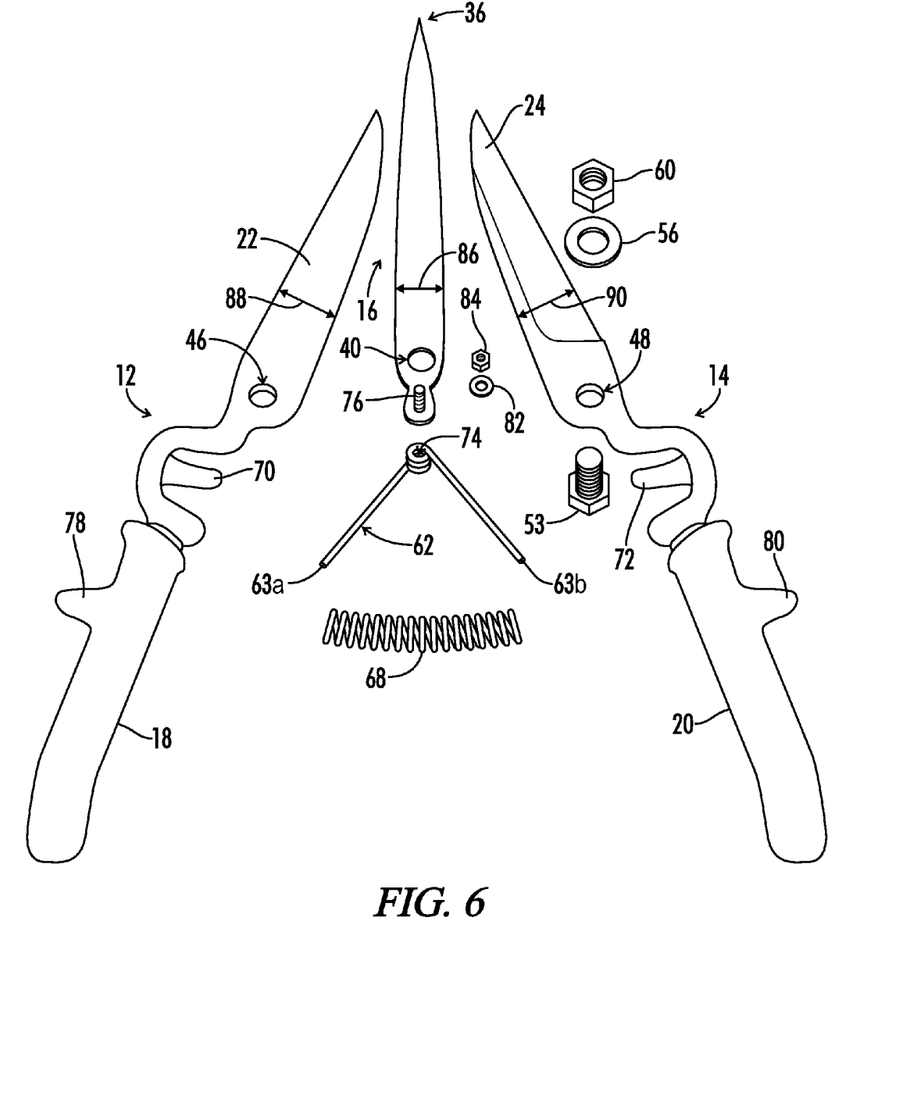
FIG. 6 illustrates an exploded view of one embodiment of a game meat removal tool in accordance with the present disclosure.

Referring further to FIG. 6, in some embodiments, spring 62 includes first and second torsion spring ends 63a, 63b. Each torsion spring end 63a, 63b can engage a corresponding member. For example, in one embodiment illustrated in FIG. 4, first torsion spring end 63a engages first member 12. Similarly, second torsion spring end 63b engages second member 14.

Figure 7:
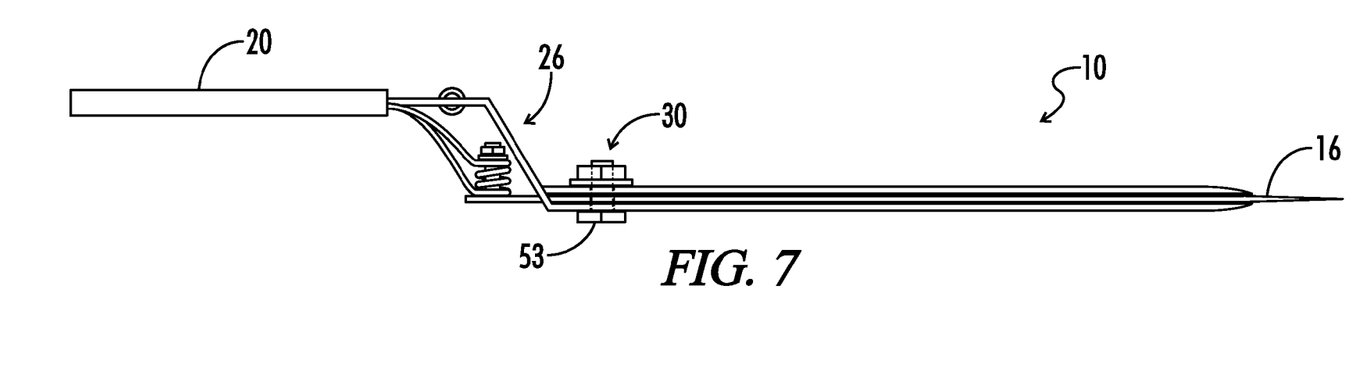
FIG. 7 illustrates a side elevation view of one embodiment of a game meat removal tool in accordance with the present disclosure
Figure 8:
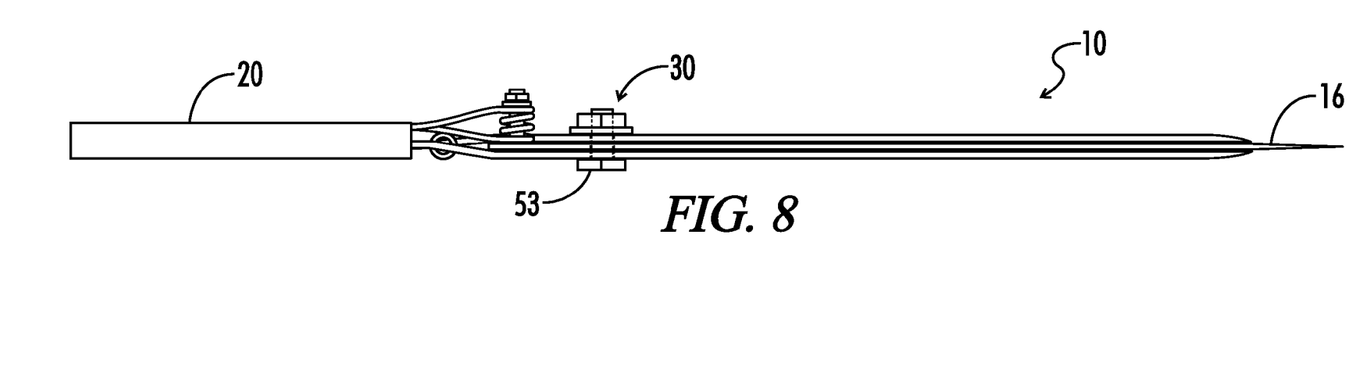
FIG. 8 illustrates a side elevation view of one embodiment of a game meat removal tool in accordance with the present disclosure.

As seen in FIG. 7, in some embodiments, tool 10 includes an offset 26 between the blades, including stabilizer bar 16, and the handles. As such, the blades, including stabilizer bar 16, may be located in a different plane than the handles. As seen in FIG. 8, in other embodiments, the handles are located in substantially the same plane as the blades, including stabilizer bar 16.

Thus, it is seen that the apparatus and methods disclosed herein achieve the ends and advantages previously mentioned. Numerous changes in the arrangement and construction of the parts and steps will be readily apparent to those skilled in the art, and are encompassed within the scope and spirit of the present disclosure as defined by the appended claims.

What is claimed is:

1. A method of removing a breast from a bird, comprising:
   (a) providing a tool having two opposing blades pivotally attached to a stabilizer bar, the stabilizer bar extending between the blades;
   (b) inserting the stabilizer bar into the bird between the breast and the spine;
   (c) moving the blades toward the stabilizer bar; and
   (d) detaching the breast from the bird.

2. The method of claim 1, wherein the game bird is a dove.

3. The method of claim 1, wherein the stabilizer bar includes first and second sharpened bar edges.

4. The method of claim 1, further comprising:
   inserting the stabilizer bar underneath the keel bone in the breast; and
   peeling the skin from the breast.

5. The method of claim 1, wherein the detached breast includes the keel bone.

6. An apparatus for removing a breast from a bird, comprising:
   a first blade;
   a second blade pivotally attached to the first blade;
   a stabilizer bar disposed between the first and second blades, wherein the stabilizer bar is configured to secure the bird while the first and second blades are angularly moveable toward the stabilizer bar for cutting the breast from the bird;
   the stabilizer bar including a base and a distal end extending from the base, the stabilizer bar defining a bar fastener slot in the base;
   the first blade including a first clearance hole aligned with the bar fastener slot;
   the second blade including a second clearance hole aligned with the bar fastener slot; and
   a fastener extending through the first clearance hole, the bar fastener slot, and the second clearance hole.

7. The apparatus of claim 6, wherein the bar fastener slot is larger than the first clearance hole.

8. The apparatus of claim 7, wherein the bar fastener slot is larger than the second clearance hole.

9. The apparatus of claim 8, further comprising:
   the stabilizer bar including first and second sharpened bar edges.

10. The apparatus of claim 9, further comprising:
    the stabilizer bar defining a bar travel slot on the base;
    a first travel pin extending from the first blade into the bar travel slot; and
    a second travel pin extending from second blade into the bar travel slot,
    wherein the first and second travel pins are moveable in the bar travel slot.

11. An apparatus for removing a breast from a bird, comprising:
    a first blade;
    a second blade pivotally attached to the first blade;
    a stabilizer bar disposed between the first and second blades;
    wherein the stabilizer bar is configured to secure the bird while the first and second blades are angularly moveable toward the stabilizer bar for cutting the breast from the bird;
    the stabilizer bar defining a bar travel slot; and
    a first travel pin extending from the first blade into the bar travel slot,
    wherein the first travel pin is moveable in the bar travel slot.

12. The apparatus of claim 11, further comprising:
    a second travel pin extending from second blade into the bar travel slot,
    wherein the second travel pin is moveable in the bar travel slot.

13. The apparatus of claim 12, further comprising:
    the stabilizer bar including first and second sharpened bar edges.

14. The apparatus of claim 13, further comprising:
    a bar fastener slot defined in the stabilizer bar; and
    a fastener extending through the bar fastener slot.

15. An apparatus for removing the breast from a game bird, the apparatus comprising:
- a first member including a first handle and a first blade;
- a second member including a second handle and a second blade, the second member pivotally attached to the first member at a pivoting joint;
- a stabilizer bar pivotally attached to the first and second members and extending between the first and second blades, the stabilizer bar including a base and a distal end extending from the base;
- a bar fastener slot defined in the base; and
- a bar travel slot defined in the base proximate the bar fastener slot,
- wherein pressing the first and second handles toward each other causes the first and second blades to move toward the stabilizer bar.

16. The apparatus of claim 15, further comprising:
- a fastener extending from the first blade through the bar fastener slot; and
- a travel pin extending from the first blade into the bar travel slot.

17. The apparatus of claim 16, further comprising:
the stabilizer bar including first and second sharpened bar edges.

18. The apparatus of claim 17, further comprising:
a spring disposed between the first and second members.

19. The apparatus of claim 18, wherein the spring is a torsion spring configured to bias the first and second blades in an open position.

* * * * *